(12) United States Patent  
Heimlich (10) Patent No.: US 7,861,432 B1  
(45) Date of Patent: Jan. 4, 2011

(54) METHOD AND APPARATUS FOR HOLE MEASUREMENT

(76) Inventor: Alan Heimlich, 5952 Dial Way, San Jose, CA (US) 95129

( * ) Notice: Subject to any disclaimer, the term of this patent is extended or adjusted under 35 U.S.C. 154(b) by 272 days.

(21) Appl. No.: 11/951,261

(22) Filed: Dec. 5, 2007

Related U.S. Application Data

(60) Provisional application No. 60/868,721, filed on Dec. 5, 2006.

(51) Int. Cl.  
*G01B 13/10* (2006.01)  
*G01B 13/16* (2006.01)

(52) U.S. Cl. .................... 33/543.1; 33/542; 73/37.9

(58) Field of Classification Search .......... 33/542, 33/543.1; 73/37.9, 37.8  
See application file for complete search history.

(56) References Cited

U.S. PATENT DOCUMENTS

| | | | | |
|---|---|---|---|---|
| 3,210,988 A | * | 10/1965 | Knobel | 73/37.9 |
| 3,508,432 A | * | 4/1970 | Bray et al. | 73/37.8 |
| 3,782,171 A | * | 1/1974 | Watt | 73/37.9 |
| 3,914,872 A | * | 10/1975 | Strzala | 33/522 |
| 4,027,525 A | * | 6/1977 | Mull | 73/37 |
| 4,772,849 A | * | 9/1988 | Tedder | 324/220 |
| 4,852,262 A | * | 8/1989 | Babcock et al. | 33/543.1 |
| 5,212,980 A | * | 5/1993 | Wegmann | 73/37.9 |
| 5,653,037 A | * | 8/1997 | Hasegawa et al. | 33/543.1 |
| 6,901,797 B2 | * | 6/2005 | Hyatt et al. | 73/37.5 |
| 7,117,719 B2 | * | 10/2006 | Sawafuji et al. | 73/37.9 |
| 7,219,533 B2 | * | 5/2007 | Ohmi et al. | 73/37.9 |
| 7,231,277 B2 | * | 6/2007 | Kawasaki et al. | 700/163 |
| 7,325,445 B1 | * | 2/2008 | Bowman | 73/104 |
| 2010/0186247 A1 | * | 7/2010 | Das et al. | 33/543.1 |

FOREIGN PATENT DOCUMENTS

JP 02293610 A * 12/1990  
WO WO 9115730 A1 * 10/1991

* cited by examiner

*Primary Examiner*—R. A. Smith (57) ABSTRACT

A method and apparatus for measuring hole parameters by using a probe signal have been disclosed.

5 Claims, 8 Drawing Sheets

METHOD AND APPARATUS FOR HOLE MEASUREMENT

RELATED APPLICATION

This patent application claims priority of U.S. Provisional Application Ser. No. 60/868,721 filed Dec. 5, 2006 titled "Method and Apparatus for Hole Measurement", which is hereby incorporated herein by reference.

FIELD OF THE INVENTION

The present invention pertains to measurement. More particularly, the present invention relates to a method and apparatus for measuring a hole.

BACKGROUND OF THE INVENTION

Manufacturing generally involves many operations including, but not limited to the formation of indentations, depressions, ways, slots, punching, bores, and holes. For the sake of discussion reference to all of these will be by the use of the word(s) hole, holes, etc. or something similar.

A common situation in manufacturing is the measurement of holes. When the holes are very small it may be difficult to measure the parameters of a hole or bore, such as but not limited to, depth, diameter, bevel, edges, roundness, etc. This may present a problem.

Measurement of a hole by direct contact with a measuring instrument may affect the hole (e.g. scratching, gouging, foreign deposits, etc.) or the instrument (e.g. material on the instrument, damage to the instrument, etc.) and not yield good consistent results. This may present a problem.

BRIEF DESCRIPTION OF THE DRAWINGS

The invention is illustrated by way of example and not limitation in the figures of the accompanying drawings in which.

DETAILED DESCRIPTION

Figure 3:
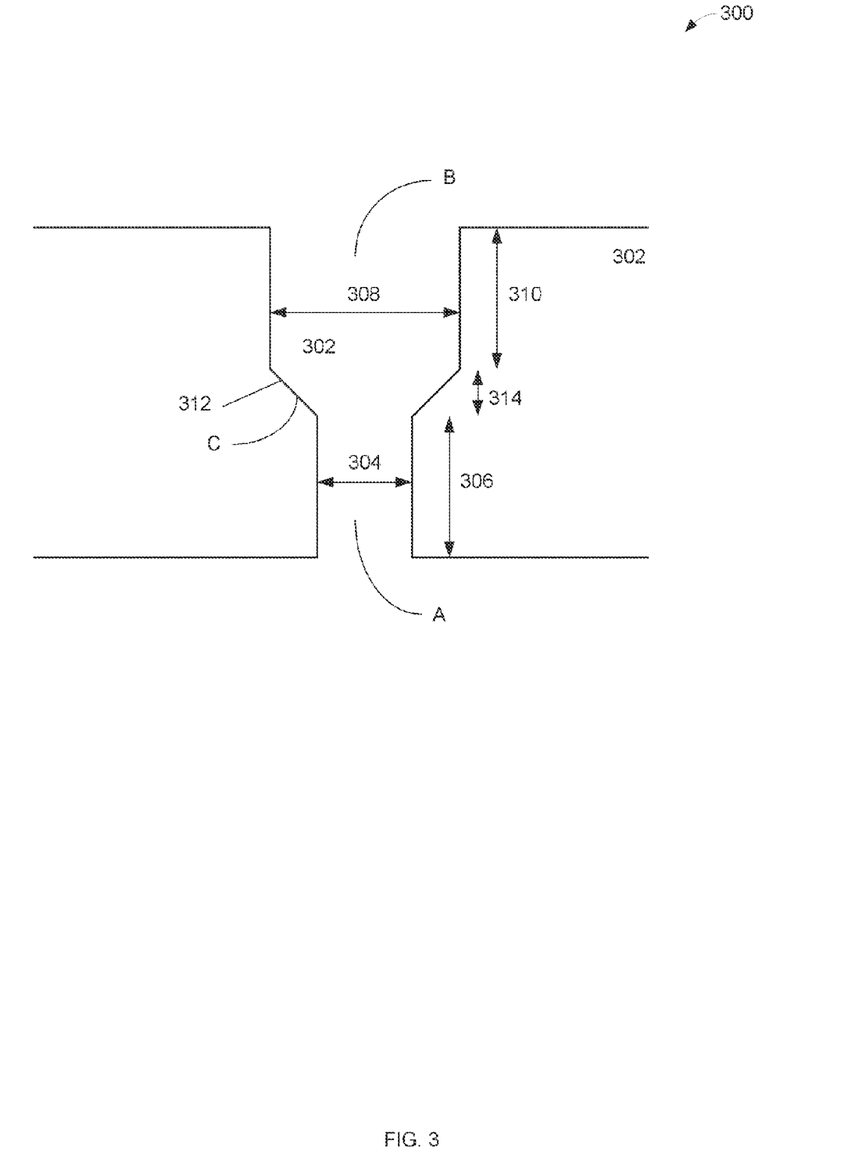
FIG. 3 illustrates a cross section of a plate having holes which may be measured by an embodiment of the invention.

FIG. 3 illustrates, generally at 300, for purposes of discussion a cross section of a plate 302 having a first hole A having a diameter 304 and a depth 306, a second hole B having a diameter 308 and a depth of 310, and a beveled edge C (such as from a drill) 312 that has a height of 314 and a diameter that varies from 308 to 304.

For discussion purposes the definition of the depth of hole B depends on the user or customer. I.e. it may be considered to be 310 or 310 plus 314 or to the middle of the bevel 312. For the purposes of discussion the measurement techniques disclosed the distinction is not germane to the invention.

Measurement of holes A and B is illustrated for the sake of discussion as this type of measurement is often needed, however, the invention is not so limited and may measure indentations, multiple holes, a single hole, etc.

Figure 4:
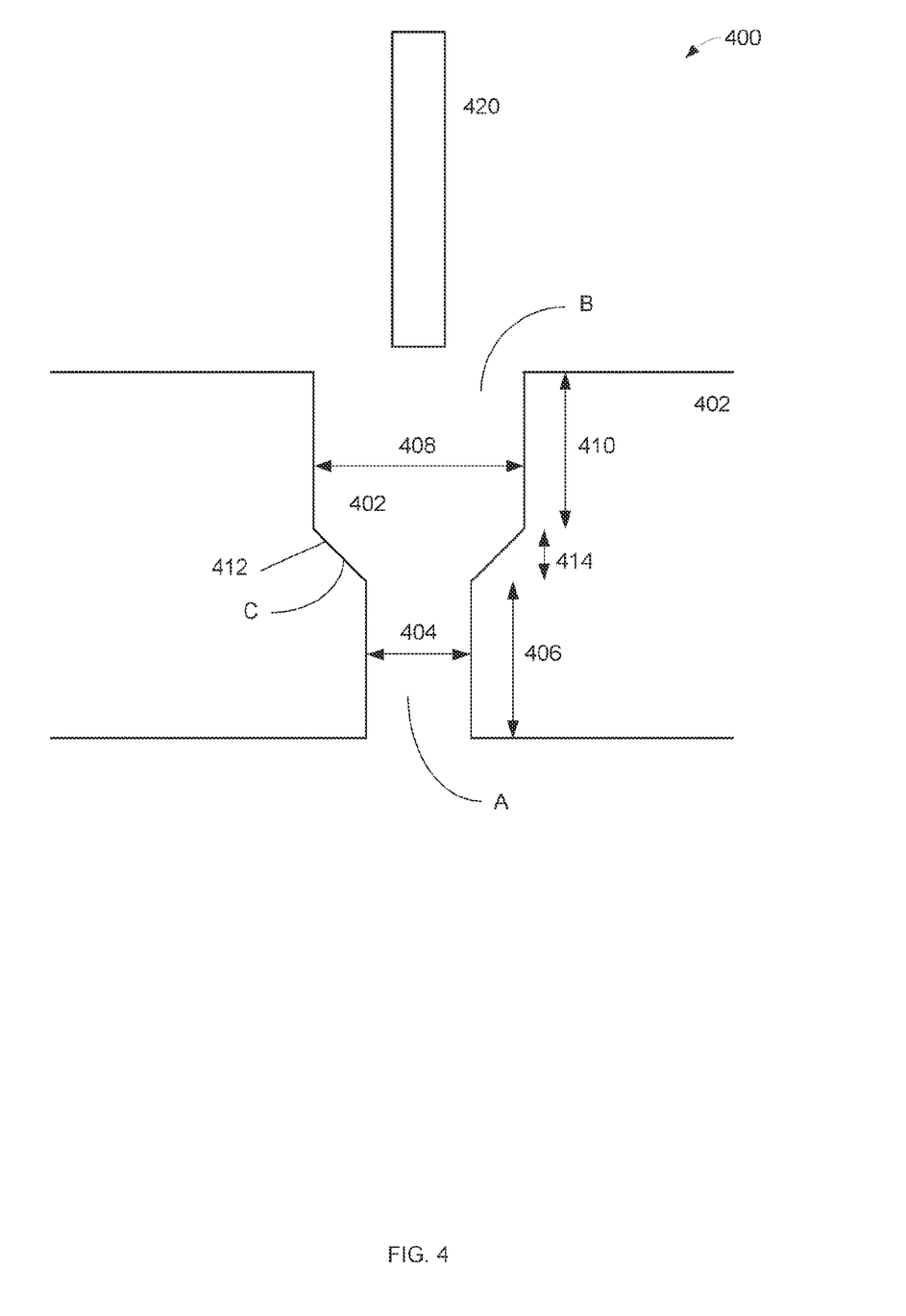
FIG. 4 illustrates one embodiment of the invention showing a moveable probe.

FIG. 4 illustrates one embodiment of the invention, generally at 400, showing a cross section of a plate 402 having a first hole A having a diameter 404 and a depth 406, a second hole B having a diameter 408 and a depth of 410, and a beveled edge C (such as from a drill) 412 that has a height of 414 and a diameter that varies from 408 to 404. An electrical probe 420 may be lowered into hole B in plate 402. The capacitance between probe 420 and plate 402 is an indicator of distance between them. As probe 420 approaches and enters hole B the distance between them is less and the capacitance between probe 420 and plate or sheet 402 will increase. The change in capacitance is indicative of the depth and the total capacitance is indicative of how close the probe 420 is to the sheet 402 and indirectly to the diameter 408 and 404 of the holes for a known diameter of probe 420.

The embodiment in FIG. 4 may also measure other than capacitance for determination of hole parameters. For example, a charge may be placed on probe 420 and the leakage current from probe 420 to sheet 402 may be measured or alternatively the total charge on probe 420 may be measured, or the discharge time for probe 420 may be measured. Each of these measurements are indicative of the positional relationship of probe 420 to the sheet 402 and holes A and B.

The embodiment in FIG. 4 may also measure other than capacitance for determination of hole parameters. For example, a light source may be positioned in, on, or about 420 to project photons into hole A and hole B and the reflectance may be measured. As the probe approaches or enters a hole, the reflectance is indicative of the hole. Additionally, transmission of light through the holes A and B may be indicative of the hole parameters.

The embodiment in FIG. 4 may also measure other than capacitance for determination of hole parameters. For example, a sound source may be positioned in, on, or about 420 to project acoustic energy into hole A and hole B and the reflected or absorbed energy may be measured. As the probe approaches or enters a hole, the reflected or absorbed energy is indicative of the hole. Additionally, transmission of sound through the holes A and B may be indicative of the hole parameters.

The embodiment in FIG. 4 may also measure other than capacitance for determination of hole parameters. For example, the inductance probe 420 may be measured with respect to, for example, sheet 402.

The embodiment in FIG. 4 may also measure other than capacitance for determination of hole parameters. For example, an alpha radioactive source may be positioned in, on, or about 420 to project alpha particles into hole A and hole B and the reflected or absorbed alpha particles may be measured. As the probe approaches or enters a hole, the reflected or absorbed alpha particles are indicative of the hole. Additionally, transmission of alpha particles through the holes A and B may be indicative of the hole parameters.

One of skill in the art will recognize also that the probe 420 and sheet 402 can form a tuned circuit and that the inductance and capacitance will determine the center frequency of such a circuit.

Figure 5:
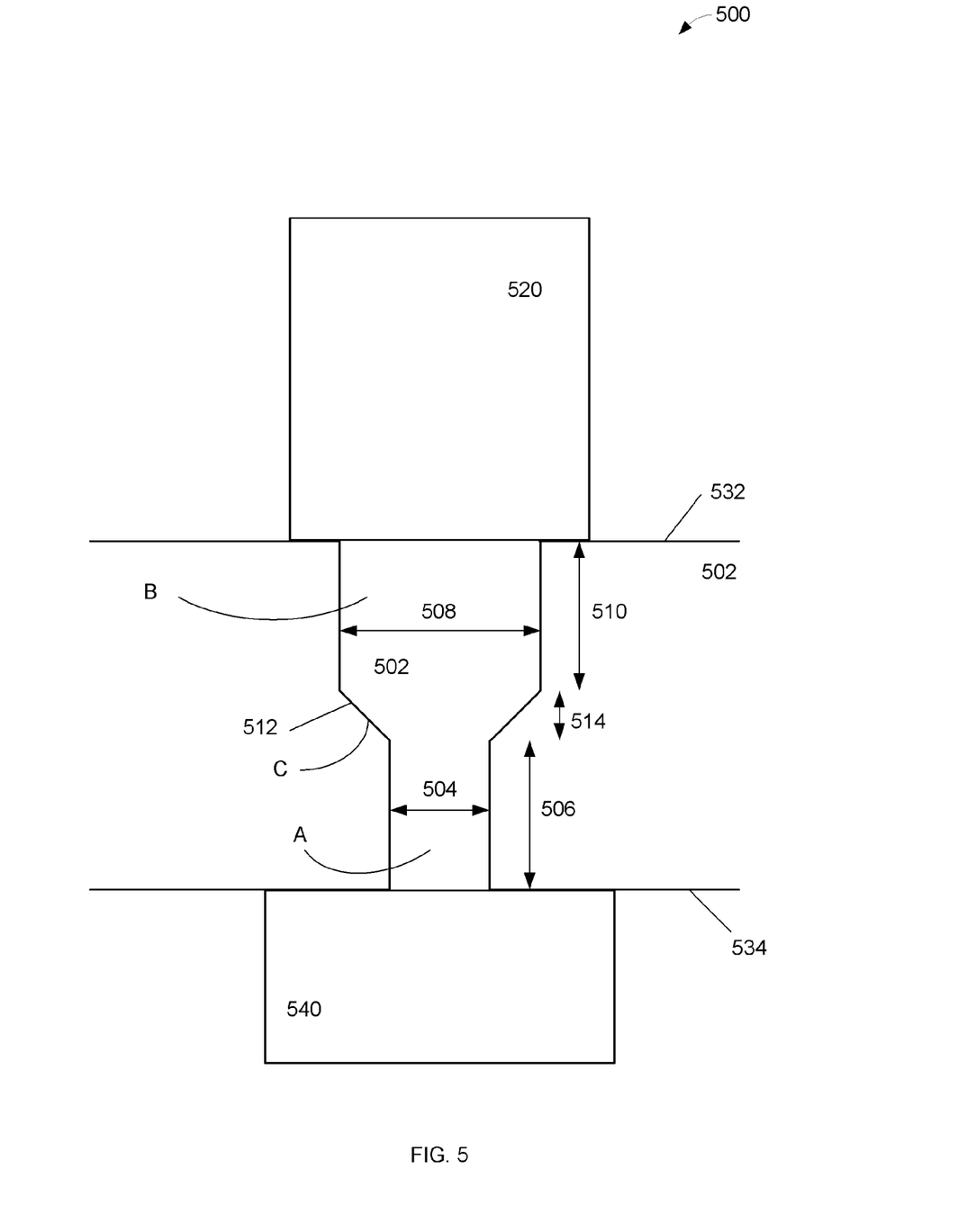
FIG. 5 illustrates one embodiment of the invention showing a fixed probe.

FIG. 5 illustrates one embodiment of the invention, generally at 500, showing a cross section of a plate 502 having a first surface 532, a second surface 534, and having a first hole A having a diameter 504 and a depth 506, a second hole B having a diameter 508 and a depth of 510, and a beveled edge C (such as from a drill) 512 that has a height of 514 and a diameter that varies from 508 to 504. A probe 520 is sealed against the top of hole B in first surface 532 of plate 502. Probe 520, in one embodiment, supplies a fluid (e.g. gas, liquid, to deformable gummy bear type substance (i.e. high viscosity)) that is forced through holes A and B. The rate change and volume of such a fluid transfer is indicative of hole parameters.

For example, in one embodiment, in FIG. 5, probe 520 may present a pressurized gas having a differential pressure between it and the outside pressure on for example the plate 502. The gas from probe 520 passes through hole B, bevel C, and hole A and exits the bottom of hole A. The pressure and volume of the gas may be measured and are indicative of the hole parameters. For example, if hole B is longer then the resistance to flow is greater. If hole B is a smaller diameter, then the resistance to flow is higher. Variations in hole A will also affect the flow of the gas.

Other embodiments of the invention are also possible, for example, in FIG. 5 a probe similar to 520 i.e. 540 may be placed on the second surface 534 at the bottom of the sheet 502 against hole A and this probe may assist in the measurement and/or contain the fluid transmitted from probe 520.

In one embodiment the transfer of fluids from probes on sheet 502 for example may simply be timed with the time measurement indicative of the hole parameters.

Embodiments of the present invention include both an apparatus, and a method.

Figure 6:
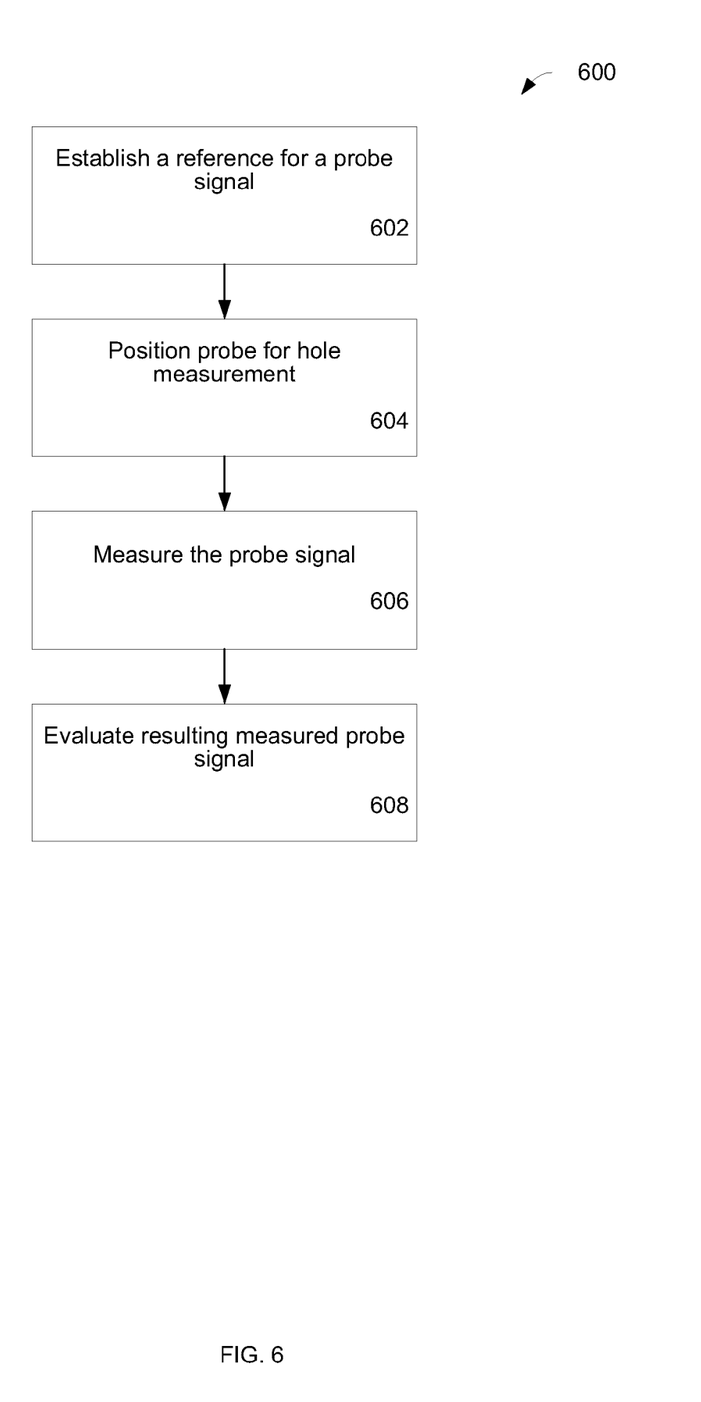
FIG. 6 illustrates one embodiment of the invention showing a measurement method.

FIG. 6 illustrates one embodiment of the present invention, generally at 600.

FIG. 6 illustrates, generally at 600, one embodiment of the present invention, showing a representation of a hole measurement method. At 602 a reference for the probe signal is established (e.g. a gas pressure), at 604 the probe is positioned (e.g. against the hole), at 605 the probe signal is measured (e.g. rate and/or volume of gas flow), and at 608 the measured probe signal is evaluated (e.g. on a computer).

In another embodiment, as illustrated in FIG. 6, after the evaluation at 608 or the measurement at 606 the probe may be repositioned at 604 and the sequence repeated as needed to measure the hole parameters.

Figure 7:
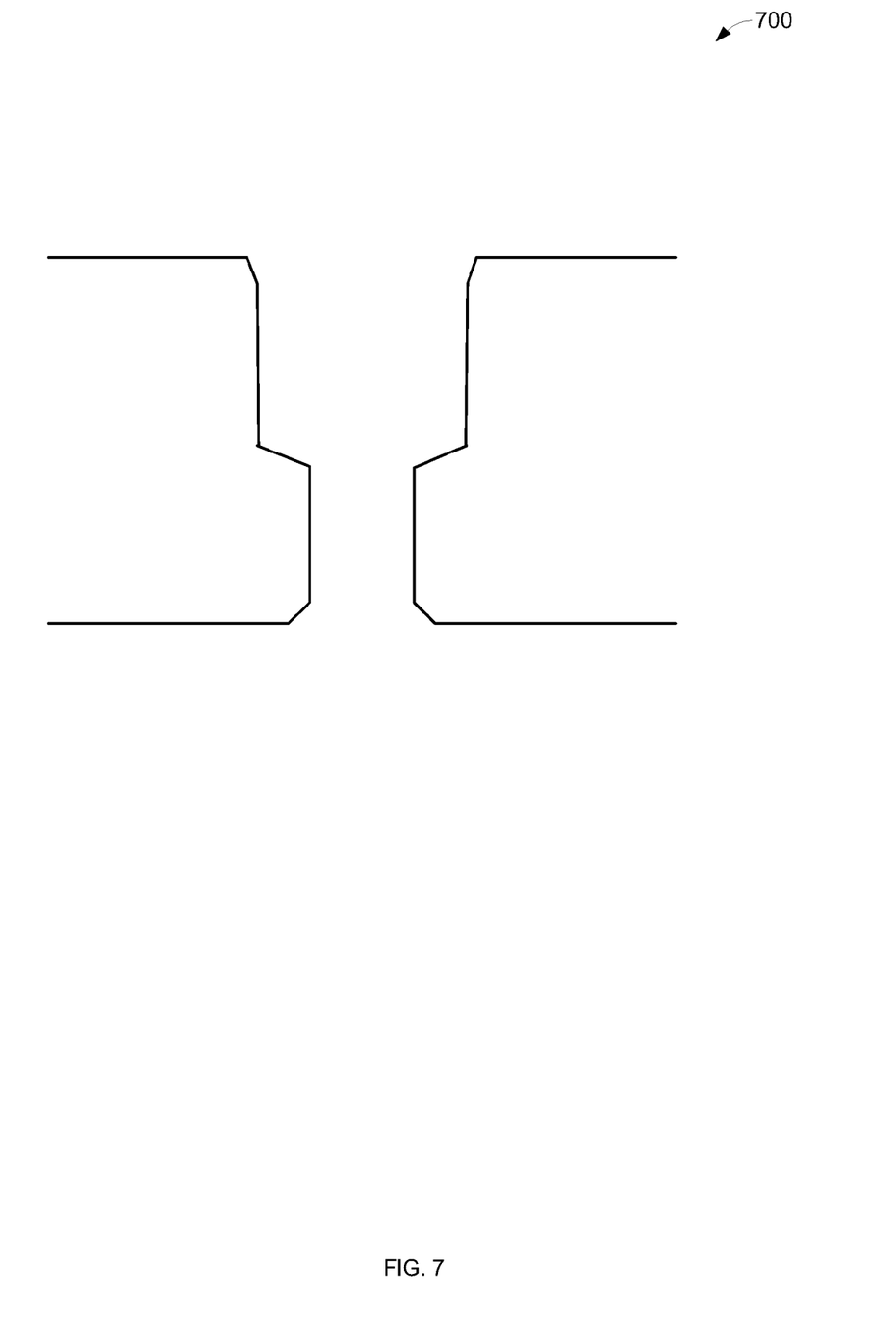
FIG. 7 illustrates a cross section of a plate having holes which may be measured by an embodiment of the invention.

FIG. 7 illustrates a cross section, generally at 700, of a plate having holes which may be measured by an embodiment of the invention.

Figure 8:
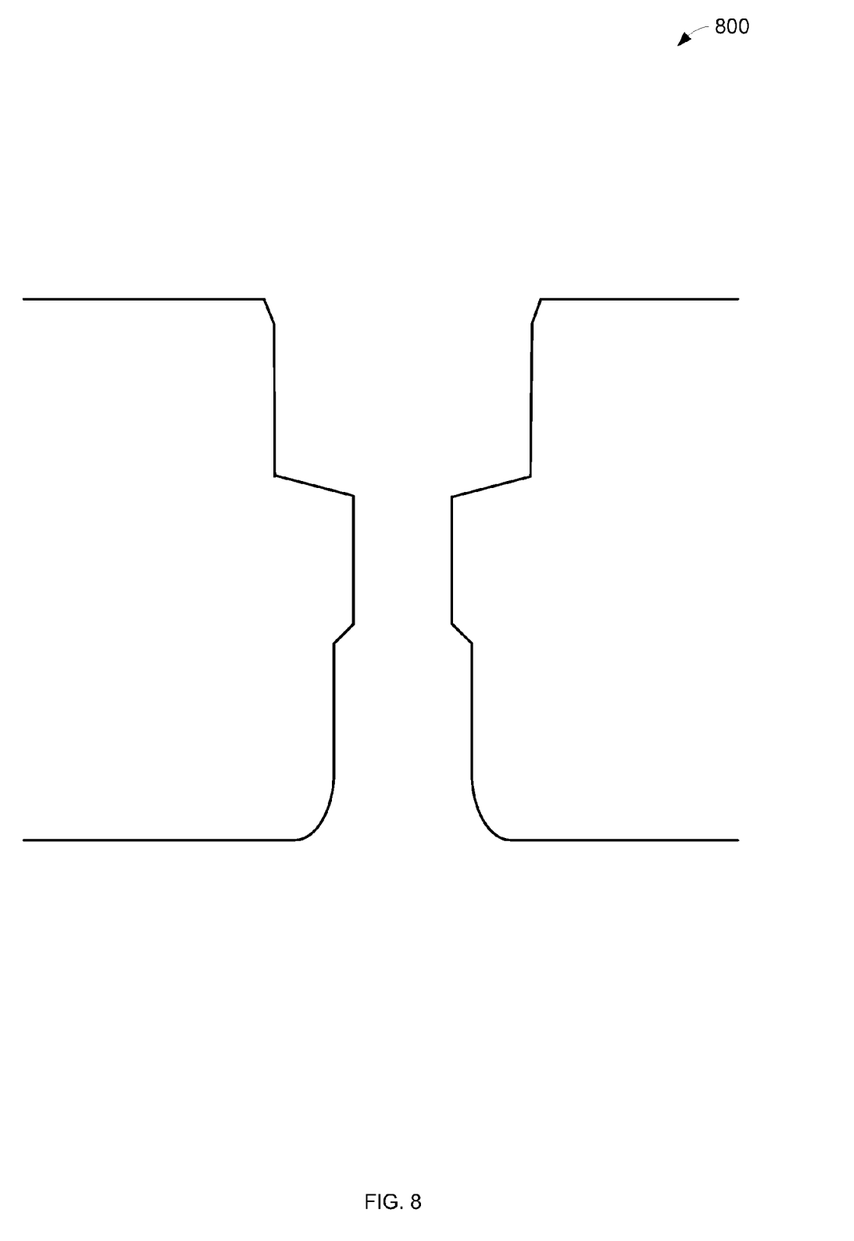
FIG. 8 illustrates a cross section of a plate having holes which may be measured by an embodiment of the invention.

FIG. 8 illustrates a cross section, generally at 800, of a plate having holes which may be measured by an embodiment of the invention.

Thus a method and apparatus for hole measurement have been described.

While the present invention has been illustrated via embodiments showing a single measurement signal, and a round fixed diameter hole, one of skill in the art will appreciate that the techniques disclosed may be used where multiple measurement signals are present and the "holes" may be of any arbitrary shape and slope. For example, ovals, ellipses, irregular indentations, tapered holes, chambered edges, etc. Additionally the techniques may be combined. For example, a fluid flow measurement may be performed before or at the same time that an acoustic measurement is being performed.

One of skill in the art will appreciate that the probe signal whether it be electrical, acoustic, radioactive, etc. in nature may be affected by and influenced by the hole parameters. Additionally, the probe signal will also be affected by the sheet material and the probe material. For example if the sheet material is an insulator then leakage current may be low and another probe signal (e.g. acoustic) may yield a better measurement.

Thus a method and apparatus for hole measurement have been described.

Figure 1:
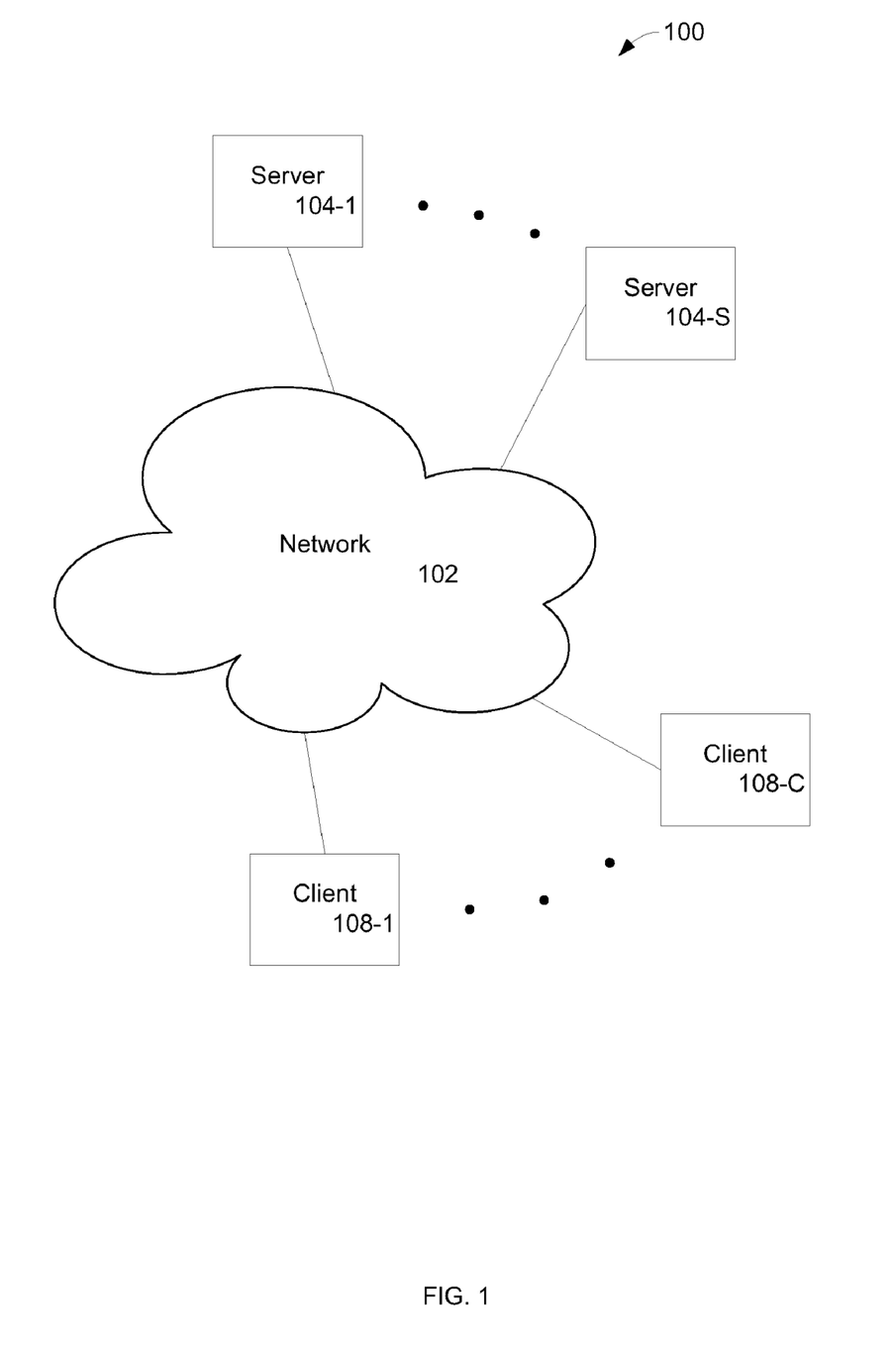
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
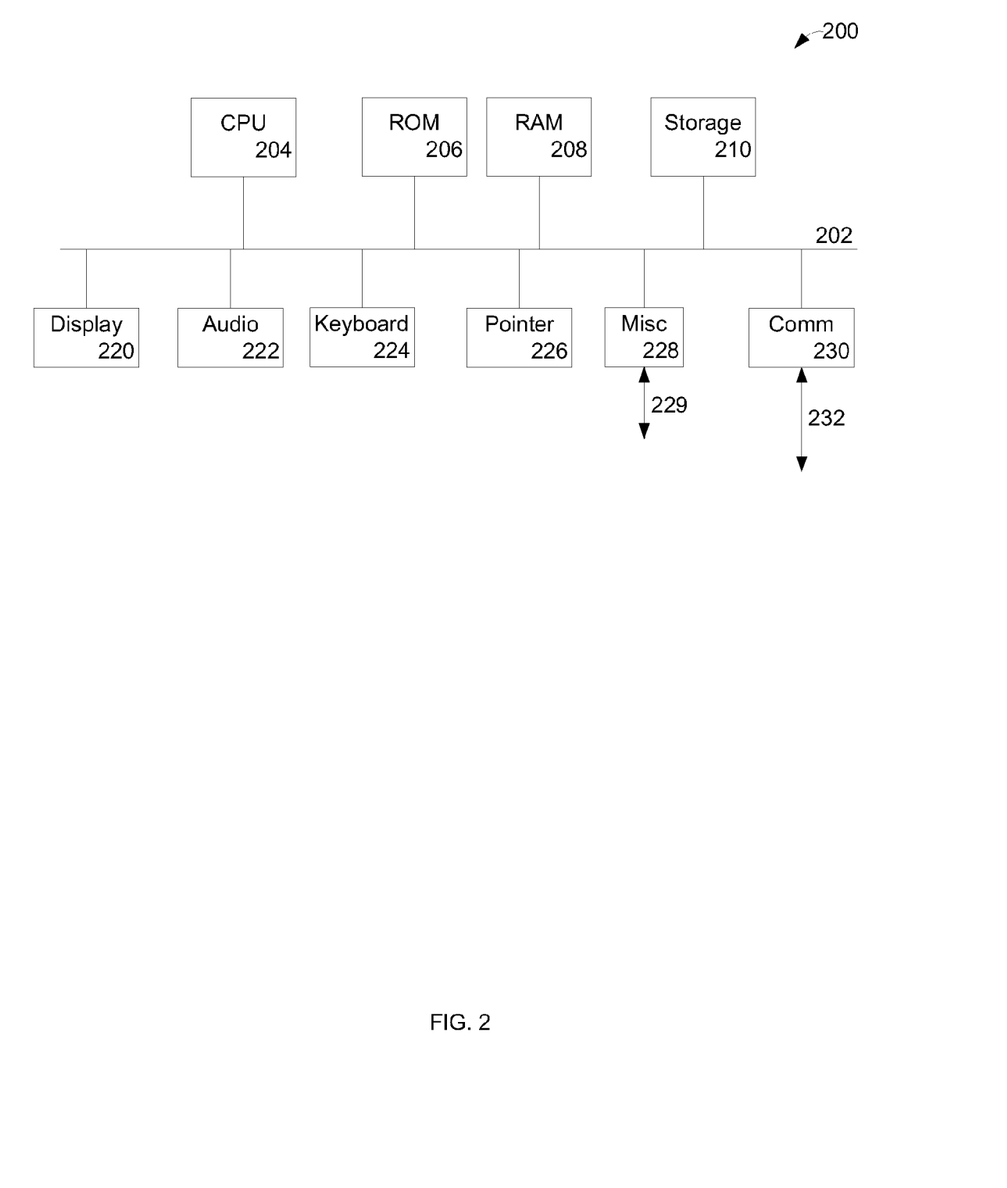
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via 229 to an another device/channel, and communications 230 via 232 to another device/channel. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those of skill in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory, and/or logic circuitry. These algorithmic descriptions and representations are the means used by those of skill in the arts to most effectively convey the substance of their work to others of skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, any of the methods according to the present invention can be implemented in hardware, fluidics, hard-wired circuitry, by programmable logic, or by any combination of hardware and software.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment;

however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for hole measurement have been described.

What is claimed is:

1. A method comprising:

establishing a first reference for a first probe signal;

positioning a first probe for a hole measurement, wherein said positioning said first probe is placing said first probe in direct contact with a first surface around a hole in said first surface such that said first probe is in fluidic communication with said hole;

measuring said first probe signal;

evaluating said measured first probe signal;

establishing a second reference for a second probe signal;

positioning a second probe for said hole measurement, wherein said positioning said second probe is placing said second probe in direct contact with a second surface around said hole in said second surface such that said second probe is in fluidic communication with said hole;

measuring said second probe signal; and evaluating said measured second probe signal.

2. The method of claim 1 wherein said first reference is a first reference pressure, and wherein said second reference is a second reference pressure.

3. The method of claim 2 wherein said first probe signal is a first probe pressure, and wherein said second probe signal is a second probe pressure.

4. The method of claim 3 wherein said evaluating said measured first probe signal and said evaluating said measured second probe signal further comprises relating said first probe pressure and said second probe pressure to a parameter of said hole.

5. The method of claim 4 wherein said parameter is selected from the group consisting of depth, diameter, bevel, edges, roundness, and roughness.

* * * * *